United States Patent [19]

Szabrak et al.

[11] 3,721,178
[45] March 20, 1973

[54] FOOD BROILER

[75] Inventors: Robert H. Szabrak; Richard A. Smith, both of Sandusky, Ohio

[73] Assignee: Sam Stein Associates, Inc., Sandusky, Ohio

[22] Filed: March 25, 1971

[21] Appl. No.: 128,057

[52] U.S. Cl. .................. 99/386, 99/355, 99/391, 99/400, 99/401, 99/443 C, 99/446, 126/41 C
[51] Int. Cl. ............................................. A47j 37/00
[58] Field of Search..126/41 C, 41 R; 99/386, 443 R, 99/443 C, 389, 390, 391, 392, 400, 401, 447, 446, 355

[56] References Cited

UNITED STATES PATENTS

| | | | |
|---|---|---|---|
| 1,458,021 | 6/1923 | Bamford | 99/386 X |
| 2,052,067 | 8/1936 | Zeimet | 126/41 X |
| 2,529,253 | 11/1950 | Hoffman et al. | 99/386 |
| 2,238,309 | 4/1941 | Cramer | 99/386 |
| 3,456,578 | 7/1969 | Pinsly | 99/386 X |
| 2,076,479 | 4/1937 | O'Connell | 99/386 X |
| 2,331,707 | 10/1943 | Lotter | 99/392 X |
| 3,372,635 | 3/1968 | Meyer | 99/386 X |

FOREIGN PATENTS OR APPLICATIONS

| | | | |
|---|---|---|---|
| 515,034 | 11/1939 | Great Britain | 126/41 |

Primary Examiner—Billy J. Wilhite
Attorney—Baldwin, Egan, Walling & Fetzer

[57] ABSTRACT

A food broiler including a horizontally extending furnace having an endless food conveyor belt extending through the furnace for carrying food portions such as hamburger patties therethrough for broiling. The hamburgers are broiled by an upper row of spaced gas burners disposed horizontally through the furnace above the conveyor belt for heating the upper surfaces of the hamburgers, and a lower row of spaced gas burners disposed horizontally through the furnace below the conveyor belt for heating the lower surfaces of the hamburgers. Each upper row burner has a V-shaped heat baffle disposed above the burner (in inverted V position) for directing heat down onto the hamburgers. Each lower row burner has a W-shaped burner plate disposed above it to radiate heat to the bottom of the hamburgers and to hold grease drippings from the hamburgers for flame flare-up to brown the hamburgers. The furnace includes a plurality of substantially identical individual modular furnace sections secured together to form the furnace, whereby the length of the furnace may be effected by adding or subtracting one or more of such modular sections to increase or decrease broiling time. The broiler is provided with a hamburger removal mechanism for removing the hamburgers from the conveyor belt and delivering them to a discharge chute.

2 Claims, 6 Drawing Figures

INVENTORS
ROBERT H. SZABRAK
BY RICHARD A. SMITH

Baldwin, Egan, Walling & Fetzer
ATTORNEYS

INVENTOR.
ROBERT. H SZABRAK
BY RICHARD A. SMITH

Baldwin, Egan, Walling & Fetzer
ATTORNEYS

FOOD BROILER

This invention relates to food broilers, and more particularly to an automatic hamburger cooker.

Heat control and efficiency of heating have always been problems in automatic hamburger broilers having gas burners. Specifically, a gas flame disposed over a conveyor belt carrying hamburgers is highly inefficient. Since heat rises, a vast amount of heat is wasted as it never reaches the hamburger. Aiming the flame directly on the hamburgers not only will cause scorching, but still results in considerable heat loss.

Another problem is achieving the correct broiling time for hamburgers of a specified thickness in an automatic hamburger broiler using a food carrying conveyor belt. If the furnace is too short, the hamburgers will be raw, and if the furnace is too long, the hamburgers will be scorched.

Therefore, it is an object of the invention to provide an automatic hamburger broiler effecting efficient control of heat from gas burners.

A further object of the invention is to provide a conveyor belt type automatic hamburger broiler of preselected variable length to effect proper broiling time.

A further object of the invention is to provide a hamburger broiler of the above type that retains meat drippings for flame flare-up to brown the hamburgers.

A further object of the invention is to provide an automatic hamburger broiler of the above type that is simple in construction, economical to manufacture, and highly effective in operation.

Briefly, the foregoing objects are accomplished by the provision of a food broiler including a horizontally extending furnace having an endless food conveyor belt extending through the furnace for carrying food portions such as hamburger patties therethrough for broiling. The belt is of wire mesh construction, and may be of specified configuration to impart preselected markings on the hamburger patties. The hamburgers are broiled by an upper row of spaced gas burners disposed horizontally through the furnace above the conveyor belt for heating the upper surfaces of the hamburgers and a lower row of spaced gas burners disposed horizontally through the furnace below the conveyor belt for heating the lower surfaces of the hamburgers. Inverted "V"-baffles are disposed above each upper row burner for radiating heat downward onto the hamburgers. W-shaped burner plates are disposed above the lower row burners to radiate heat to the bottom of the hamburgers and to hold grease drippings for flame flare-up to brown the hamburgers. The furnace includes a plurality of substantially identical individual modular furnace sections secured together to form the furnace, whereby the length of the furnace may be effected by adding or subtracting one or more of such modular sections to increase or decrease broiling time. A hamburger removal mechanism is provided for removing the hamburgers from the conveyor belt onto a discharge chute. Boltless means are provided to secure the baffles and plates in position to simplify their removal for cleaning.

Thus, there is provided an automatic hamburger cooker effecting efficient control of heat and providing furnace length adjusting means to control broiling time. Grease drippings are retained for flame flare-up.

Other objects and advantages of the invention will be apparent from the following description taken in conjunction with the drawings wherein.

Although the invention is shown and described herein with respect to broiling hamburgers, it will be understood that it may be applied to heating any type of food capable of being cooked between upper and lower rows of burners.

The terms and expressions which have been used are used as terms of description, and not of limitation, and there is no intention in the use of such terms and expressions of excluding any equivalents of any of the features shown or described, or portions thereof, but it is recognized that various modifications are possible within the scope of the invention claimed.

Figure 1:
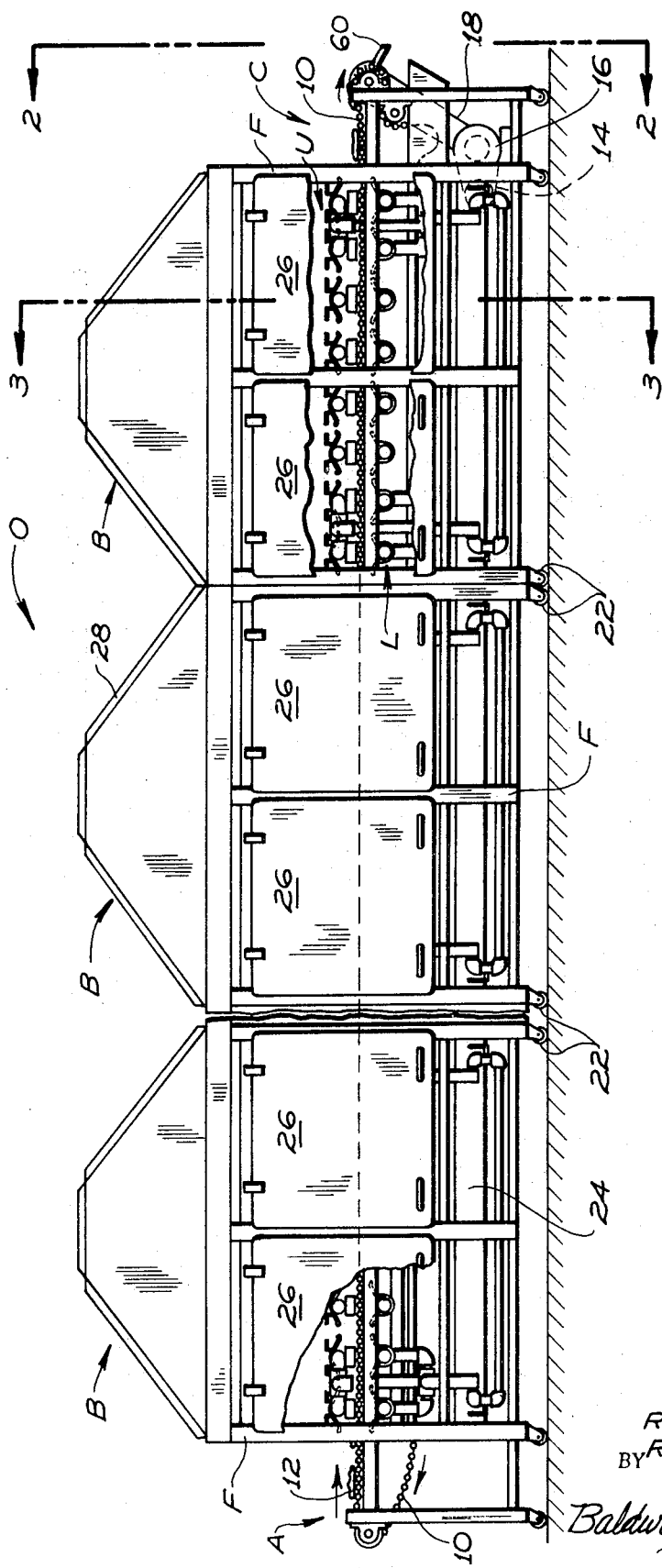
FIG. 1 is a side elevational view of an automatic hamburger cooking apparatus constructed in accordance with the invention.
Figure 2:
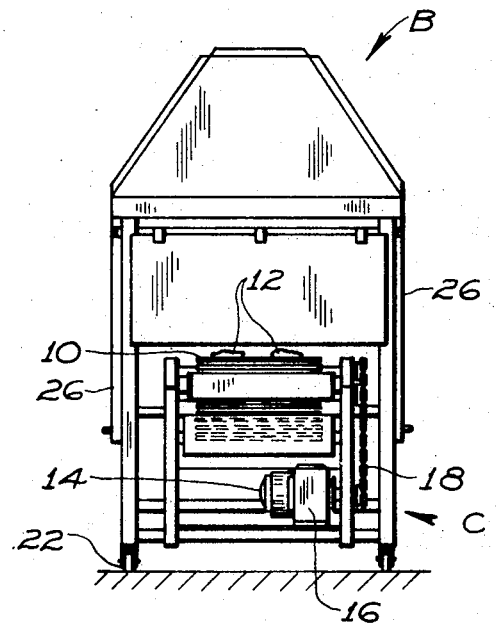
FIG. 2 is a view taken along the line 2—2 of FIG. 1.

Referring first to FIG. 1, there is shown an automatic food broiler or oven, generally designated as O, in the form of a horizontally extending furnace including a plurality of individual oven sections such as feed section A, intermediate sections B, and a drive section C. Disposed longitudinally through the oven O is an endless horizontal conveyor wire mesh belt 10 for carrying food portions such as the hamburgers 12 therethrough. The belt may be driven by any suitable drive means such as the motor 14 (FIGS. 1 and 2), the gear box 16 and the drive belt 18.

Figure 3:
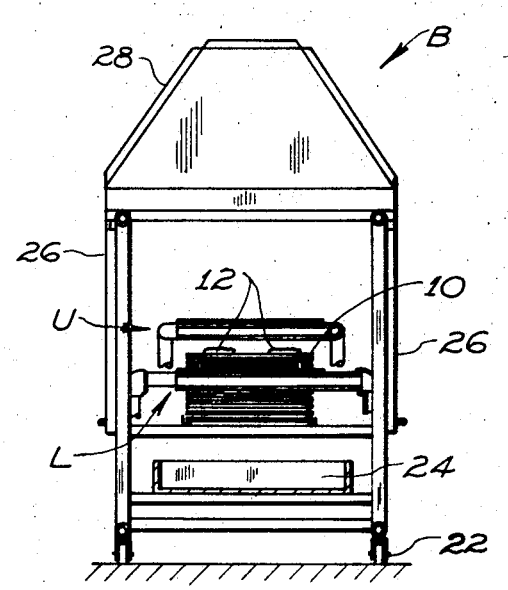
FIG. 3 is a view taken along the line 3—3 of FIG. 1.

The hamburgers are heated on their upper surfaces by gas flame heat from an upper row of spaced individual gas burners disposed horizontally through the furnace or oven O above the conveyor belt 10, such upper row or burners being designated as U (FIGS. 1 and 3). The lower surfaces of the hamburgers are heated by a lower row L of like gas burners disposed horizontally through the oven below the conveyor belt 10.

The sections B are of substantially similar construction. The middle or intermediate of the modular sections B, for example, includes a frame F, disposed on casters 22, grease drip pans 24 (FIG. 3), side covers 26, and a hood 28. The length of the oven O may be changed by adding or subtracting one or more of such sections B, for example, to increase or decrease broiling time.

Figure 4:
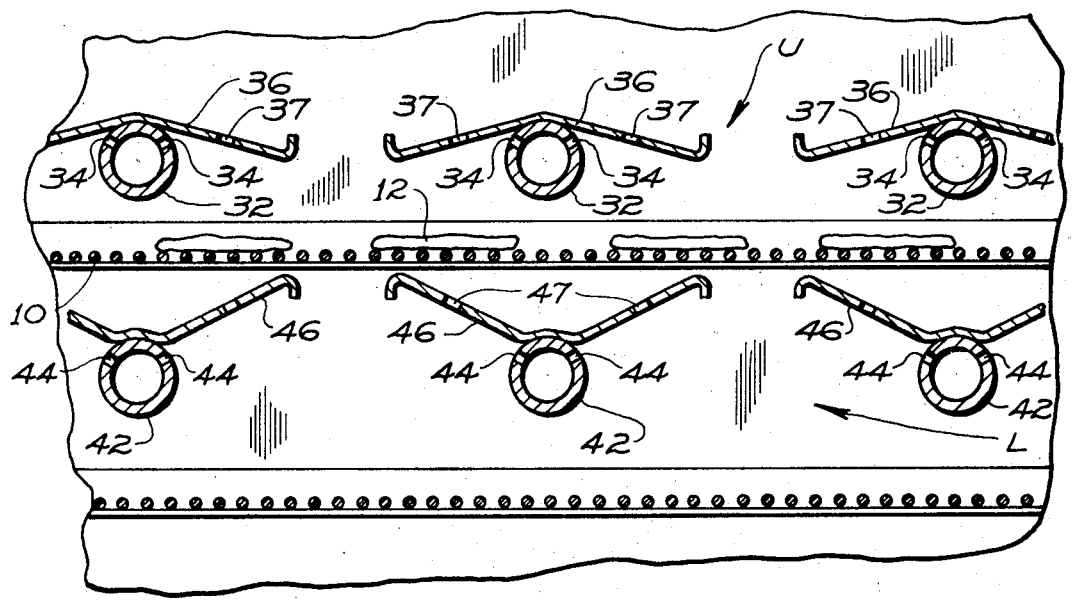
FIG. 4 is an enlarged transverse fragmental sectional view of a portion of the upper and lower rows of gas burners of FIG. 1 and showing the conveyor belt therebetween.

Referring now to FIG. 4, each individual gas burner 32 in the upper row U has a plurality of upwardly directed gas outlet orifices 34 emitting a gas flame. Placed above the burner 32 is a baffle 36 which is V-shaped in transverse section and is disposed in "inverted-V" position above the burner to reflect or radiate heat (rising upwardly from the gas flame)

downwardly onto the hamburgers to heat or broil the upper surfaces thereof in a steady even manner. The baffles 36 have smoke holes 37 therein.

Each individual gas burner 42 in the lower row L has a plurality of upwardly directed gas outlet orifices 44 emitting a gas flame upwardly against the W-shaped baffle or burner plate 46, which is disposed above the burner. Thus the baffle or plate 46 is heated and heat rising from such heated baffle radiates heat to and broils the lower surfaces of the hamburgers. This construction also provides a very even and steady application of heat to the hamburgers. The plates 46 also hold grease drippings for flame flare-up to brown the hamburgers. The plates 46 may have smoke holes 47 therein.

Thus, there is provided an automatic hamburger broiling oven effecting efficient use of gas flame heat and providing a steady and even controlled heat to the food portions. Broiling time may be changed by adding or subtracting one or more of the modular sections B, for example.

Figure 5:
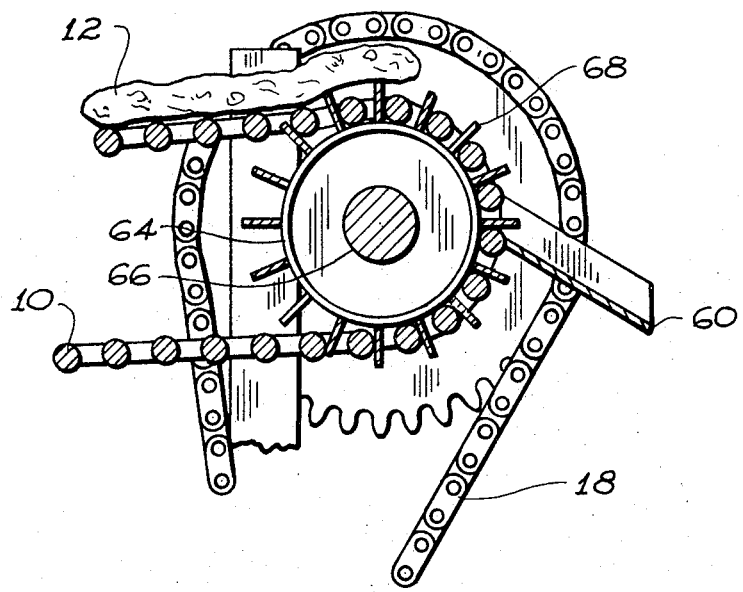
FIG. 5 is an enlarged vertical sectional view of the hamburger removal device shown at the right end of the conveyor belt in FIG. 1.

In FIG. 5, there is shown a hamburger removal means for removing the hamburger patties 12 from the conveyor belt 10 and thence delivering them to a discharge chute 60. Such device includes a rotatable sprocket wheel 64 secured to the drive shaft 66 and having a plurality of radially extending pins 68 extending through the belt 10 a predetermined distance so as to first lift and thence carry the hamburger patties over to the discharge chute 60 as shown.

Figure 6:
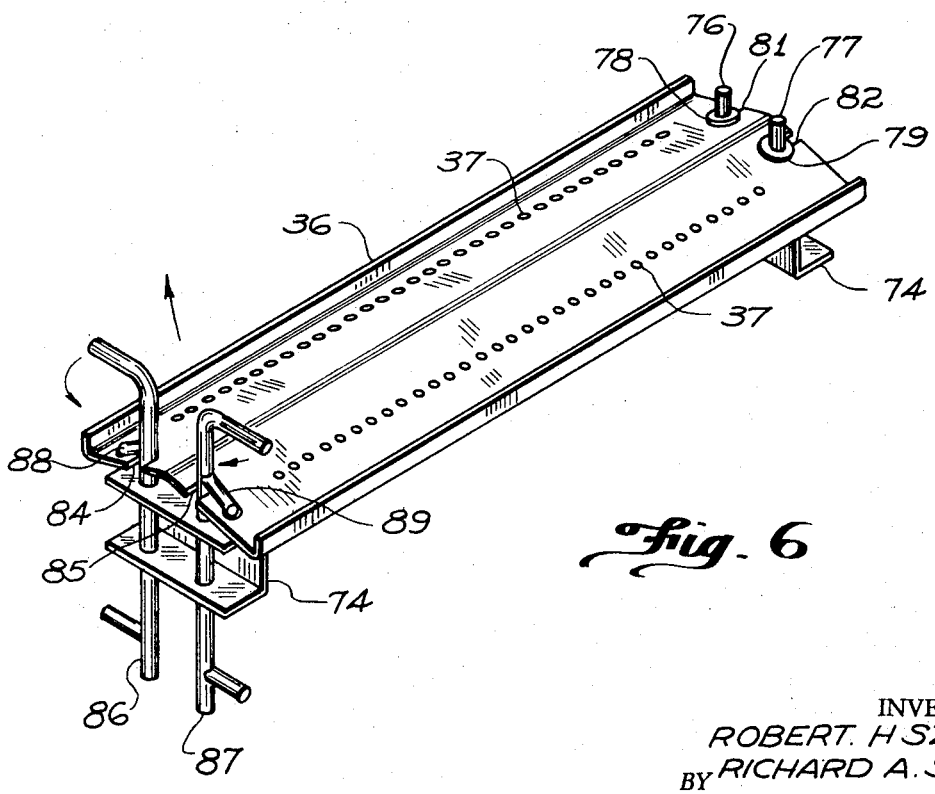
FIG. 6 is an enlarged perspective view of one of the burner plates shown in FIG. 4, and showing the securing devices for retaining such plates in position.

Referring now to FIG. 6, there is shown boltless means for securing the baffles 36 in position to simplify their removal for cleaning. Specifically, the baffle 36 is retained on an elongated frame 74 which is part of the broiler structure. At the right end, the frame 74 has a pair of spaced pins 76, 77, which in turn, have washers 78, 79 welded or otherwise secured thereto. The baffle 36 has a pair of spaced slots 81, 82 in which the pins 76, 77, respectively, are disposed (with the washers above the baffle top surface), to thus releasably lock the right end of the baffle in operative position.

The left end of the baffle 36 has a pair of spaced slots 84, 85, which receive pins 86, 87, respectively therein. The pins 86, 87 are rotatably disposed on the frame 74 for rotation about a vertical axis, and have side projecting stems 88, 89, respectively extending out from such pins at substantially a right angle. The pins 86, 87 are also movable vertically, but cannot be moved any higher than shown in FIG. 6. In operation, the right end of the baffle 36 is first secured to the frame 74 as abovedescribed, and then the left end of the baffle is forced down (the baffle is partially resilient) slightly below the level of the stems 88, 89 and the slots 84, 85 then receive the pins 86, 87. Next the pins 86, 87 are turned so the stems 88, 89 abut the top surface of the baffle to lock it in position. The slots 81, 82, 84, 85 are (longitudinally) long enough to enable the baffle 36 to be moved a limited amount in a direction along its longitudinal axis to effect the aforedescribed securing operation.

What is claimed is:

1. A food broiler comprising, a horizontally extending furnace, an endless conveyor belt extending horizontally through the furnace for carrying food portions therethrough, means for driving the conveyor belt through the furnace, an upper row of spaced individual gas burners disposed horizontally through the furnace above the conveyor belt for heating the upper surfaces of food portions on the belt, and a lower row of spaced individual gas burners disposed horizontally through the furnace below the conveyor belt for heating the lower surfaces of food portions on the belt, at least one gas burner in the upper row of burners having a heat baffle disposed thereabove for reflecting heat from such gas burner onto the food portions on the conveyor belt therebelow, at least one gas burner in the lower row of burners having a burner plate disposed thereabove and secured to the furnace, said burner plate being W-shaped in cross-sectional configuration to hold grease drippings from the food portions for flame flare-up to brown such food portions.

2. The structure of claim 1 and further including boltless means for securing the baffles to the furnace.

* * * * *